W. REAGAN.
ANTISKIDDING AND TRACTION DEVICE FOR AUTOMOBILE AND OTHER WHEELS.
APPLICATION FILED FEB. 12, 1910.
968,414.
Patented Aug. 23, 1910.
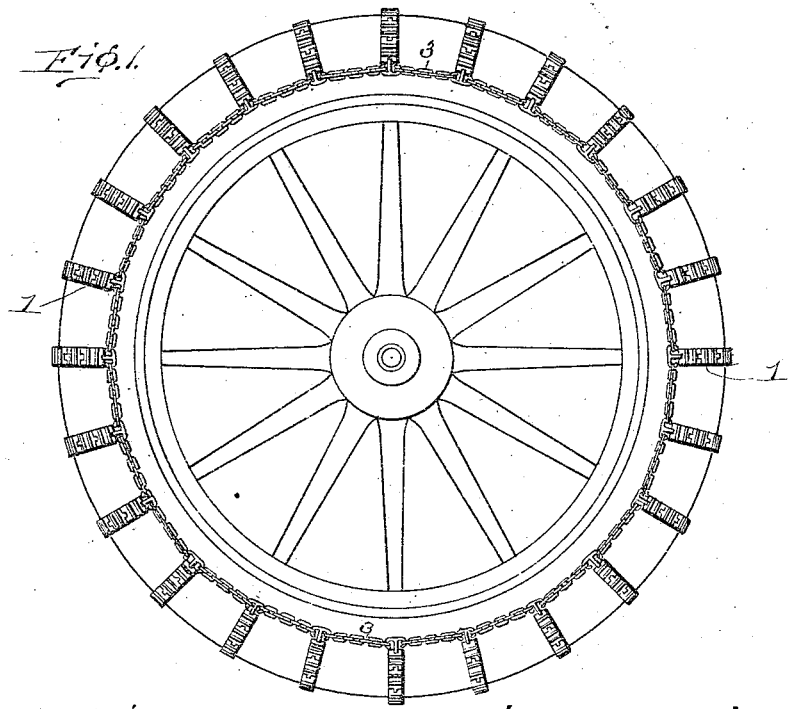
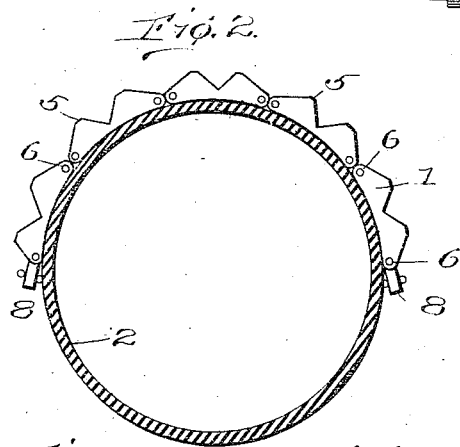
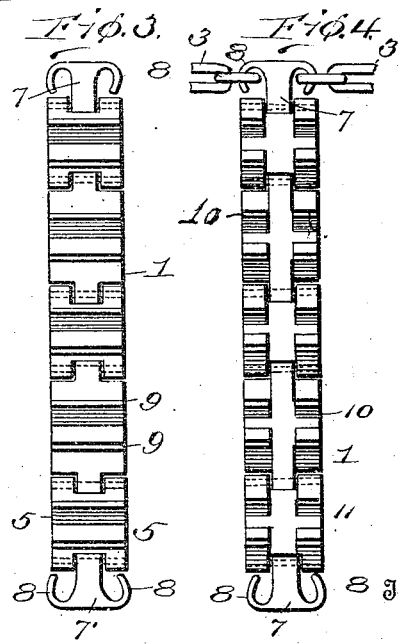
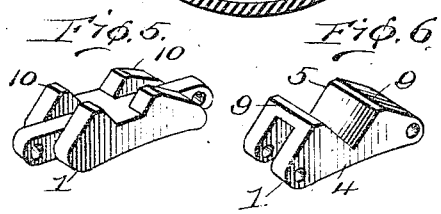
William Reagan, Inventor
By J. R. Nottingham, Attorney
Witnesses: J. M. Fowler Jr., Frank G. Brereton

UNITED STATES PATENT OFFICE.

WILLIAM REAGAN, OF PHILADELPHIA, PENNSYLVANIA.

ANTISKIDDING AND TRACTION DEVICE FOR AUTOMOBILE AND OTHER WHEELS.

968,414.
Specification of Letters Patent. Patented Aug. 23, 1910.
Application filed February 12, 1910. Serial No. 543,583.

*To all whom it may concern:*

Be it known that I, WILLIAM REAGAN, a citizen of the United States, residing at Philadelphia, in the county of Philadelphia and State of Pennsylvania, have invented certain new and useful Improvements in Antiskidding and Traction Devices for Automobile and other Wheels; and I do hereby declare the following to be a full, clear, and exact description of the invention, such as will enable others skilled in the art to which it appertains to make and use the same.

This invention relates to anti-skidding and traction devices for vehicle wheels of the cushion or pneumatic type; and it consists in arranging around the circumference of such wheels, at intervals, groups of calk-bearing sections which are pivoted directly to each other, and means for holding the groups in their spaced relation, as will be hereinafter described, and pointed out in the claims.

Heretofore, anti-skidding devices have been provided with calk-bearing sections that are united by intervening links. Such a construction admits of a bodily motion of the sections which, as the group of sections is brought into contact with the ground, by the revolution of the wheel, tend to become disposed in planes parallel with the ground, the calks of each section pointing directly downward. This relation of the calks to the ground is ineffective to prevent or check skidding, because the rather blunt form of such calks causes the advancing side thereof to present an inclined surface to resisting bodies of matter in the road-way, thus permitting the calk to easily ride over such bodies. In view of this obvious fact, it is desirable that the calks lying upon either side of the centrally-disposed calks shall point or extend lateraly at an inclination, so as to enable them to effectively check the tendency to skid. This they do, because the edge of an inclined, symmetrical calk will more certainly engage or penetrate the road-bed than a calk that stands vertical.

Hence one of the principal objects of this invention is to so construct and arrange the calk-bearing sections that the calks lying upon either side of the central calk-sections will be inclined laterally, so that they will be sure to engage or penetrate the ground and thereby check any tendency of the wheel, to which they are attached, to skid.

Other objects of the invention will become apparent upon a full disclosure thereof.

In the drawings:—Figure 1 is a side elevation of an automobile wheel, showing my invention applied thereto; Fig. 2, a transverse section of the tire, showing a group of my anti-skidding devices arranged thereon; Fig. 3, a top plan view of a group of calk-bearing sections, showing one form of calks; Fig. 4, a similar view, showing another form of calks; Fig. 5, a detail perspective view of one of the calk-sections shown in Fig. 4; and Fig. 6, a similar view of one of the calk-sections shown in Fig. 3.

Specifically, the invention consists of a suitable number of peculiarly related calk-bearing sections 1, grouped at intervals around the circumference of the tire 2 of an automobile wheel, the groups being held in their spaced relation by circular retaining members 3 which, in the present instance, are chains. The calk-bearing sections consist of slightly curved metallic blocks 4, each of which is provided with one or more calks 5, sharpened to readily penetrate or engage a road surface, a pavement, or ice and snow. The calk-bearing sections are pivoted each to the adjacent section by means of a knuckle-joint having a removable pintle 6, and the end calk-sections of each group is likewise pivoted to a securing-block 7, to which is connected a link of the retaining-member, or chain, of which it constitutes a part, the end of each securing-block being provided with oppositely-disposed hooks 8 to receive links of contiguous sections of said retaining-members or chains. These hooks are so disposed that the adjacent calk-bearing sections prevent disengagement of the links, but the withdrawal of the pintle which connects the securing-block with the end section, will allow the removal of the links from the hooks.

By omitting the intervening link, heretofore employed to unite the calk-bearing sections and pivoting said sections directly to each other, the number of calks, of given length, engaging the ground at any time is increased, thereby increasing the holding-action. This increase in the number of calks also increases the disposition of certain of the calk-bearing sections at points in the lateral curved surface of the wheel-tire, which approximately coincide with the side of the flattened load-bearing portion thereof. This is advantageous, because as the side sections have to swing around the pivots of the momentarily fixed central section, they enter or touch the ground at one corner only, and the calks readily penetrate it, although remaining at a certain angle of inclination.

It will be noted that in Figs. 1, 2, 3 and 6, the calks are sharpened to an edge 9, and extend transversely of the section, while in Figs. 4 and 5, the number of calks to a section is increased, and consequently the holding-section is further increased, and by reason of their peculiar shape, being in the form of spurs 10, traction is materially assisted, owing to their penetrating effect.

Having thus fully described my invention, what I claim is:—

1. An anti-skidding device, for automobiles, comprising a plurality of calk-bearing sections directly pivoted to one another, each of said sections being of less length than the width of the normal flattened portion of the tire.

2. An anti-skidding and traction device, for automobiles, having in combination calk-bearing section retaining members and calk-bearing sections which are directly pivoted to each other and flexibly connected to the retaining members.

3. An anti-skidding and traction device, for automobiles, having in combination calk-bearing section retaining members and calk-bearing sections which are directly pivoted to each other and flexibly connected to the retaining members, said sections being of less length than the width of the normal flattened load-bearing portion of the tire.

4. An anti-skidding and traction device for automobiles, composed of suitable retaining-members, in combination with relatively movable calk-bearing sections directly pivoted to each other, a plurality of which lie within the arc of the normal flattened portion of the load-bearing tire.

5. An anti-skidding and traction device for automobiles, having in combination a plurality of calk-bearing sections directly pivoted to each other, a securing-block pivoted to each end section, said securing-blocks being provided with hooks, and calk-bearing section retaining members connected with said hooks, whereby the calk-bearing sections are firmly held onto the tire, said hooks being so disposed that the adjacent calk-bearing sections prevent disengagement of the links.

In testimony whereof I affix my signature, in the presence of two witnesses.

WILLIAM REAGAN.

Witnesses:
WILLIAM SHERRER,
J. W. CASSIDY.